United States Patent [19]
Yahagi et al.

[11] Patent Number: 5,201,952
[45] Date of Patent: Apr. 13, 1993

[54] METHOD AND APPARATUS FOR APPLYING A UNIFORM ADHESIVE COAT TO A RESIN-COATED MANDREL

[75] Inventors: Masakazu Yahagi; Takeo Sato; Masahiro Ebisawa, all of Ibaragi, Japan

[73] Assignee: The Yokohama Rubber Co., Ltd., Tokyo, Japan

[21] Appl. No.: 683,063

[22] Filed: Apr. 10, 1991

[30] Foreign Application Priority Data

Apr. 16, 1990 [JP] Japan ................................. 2-97638

[51] Int. Cl.⁵ .............................................. B05C 11/02
[52] U.S. Cl. ...................................... 118/109; 118/125; 118/325; 118/DIG. 11
[58] Field of Search ............... 118/109, 123, 125, 325, 118/DIG. 11, DIG. 13

[56] References Cited

U.S. PATENT DOCUMENTS

| | | | |
|---|---|---|---|
| 2,062,389 | 12/1936 | Bleibler | 118/125 |
| 3,166,440 | 1/1965 | Carmichael et al. | 118/109 |
| 4,212,908 | 7/1980 | Hendy et al. | 118/125 |
| 4,391,218 | 7/1983 | Horikawa et al. | 118/123 |
| 4,978,413 | 12/1990 | Schotter | 118/125 |

*Primary Examiner*—Michael G. Wityshyn
*Attorney, Agent, or Firm*—Finnegan, Henderson, Farabow, Garrett & Dunner

[57] ABSTRACT

A method and apparatus for applying a uniform coating of an adhesive compound to a resin-coated mandrel. A scraper formed from a circular knitted web of long length nylon fibers is located at the leading tip end of a tapered tube to scrape off any excess adhesive and obtain the uniform, smooth coating on the mandrel.

3 Claims, 1 Drawing Sheet

U.S. Patent
Apr. 13, 1993
5,201,952

METHOD AND APPARATUS FOR APPLYING A UNIFORM ADHESIVE COAT TO A RESIN-COATED MANDREL

BACKGROUND OF THE INVENTION

1. Field of the Invention

This invention relates generally to the manufacture of hoses for the transport of various fluid materials and has particular reference to a method of and an apparatus for applying a uniform layer of adhesive coating to a mandrel about which is wrapped a hose constituent layered structure.

2. Prior Art

In the manufacture of hoses, it has been a conventional practice to apply an adhesive coating continuously onto an elongated resin-coated mandrel of round rod or cylindrical form and squeeze the coating off to a uniform thickness by drawing the mandrel through a guide hole in a plate member such as of felt, rubber, sponge and the like. The mandrel is thereafter dried, followed by wrapping it with an inner elastomeric layer, reinforcement layers and a cover layer in this successive order as is well known in the art. Such a conventional method has a drawback in that the peripheral wall of the guide hole is susceptible to wear or deformation upon incessant contact with the resin-coated outer surface of the mandrel, causing the latter to displace or mis-orient relative to its axis.

Another drawback is that dust or debris of the felt, rubber or sponge member tends to fall into the adhesive coating, resulting in a defective product hose.

SUMMARY OF THE INVENTION

With the foregoing drawbacks of the prior art in view, the present invention seeks to provide a method of applying an adhesive coating to a mandrel which will provide a uniform and smooth coat over and around the entire periphery of the mandrel.

The present invention further seeks to provide an apparatus which will carry the above method into practice.

According to one aspect of the invention, there is provided a method of applying a uniform adhesive coating to a resin coated mandrel which comprises applying a predetermined amount of an adhesive compound continuously and peripherally to and over the mandrel, advancing the mandrel along a horizontal path of movement, drawing a leading end of the mandrel through a circular opening defined by a circular knit web of long length nylon fibers secured to a leading tapered end of a control means whereupon any excess of the adhesive coating is scraped off to maintain a uniform coating thickness, allowing the control means to move pivotally relative to the axis of the mandrel and heating the mandrel to dry the adhesive coat.

According to another aspect of the invention, there is provided an apparatus for applying a uniform adhesive coating to a resin-coated mandrel which comprises an applicator for continuously applying a coating of an adhesive compound peripherally to and over the mandrel, a heater located remote from the applicator and adapted to dry the adhesive compound which has been coated on the mandrel, a control means for controlling the thickness of the coating of the adhesive compound, the control means being in the form of a cylindrical tube having a tapered tip end and having a scraper means at the tapered tip end for scraping off any excess of the adhesive compound, the scraper means being formed from a circular knit web of long length nylon fibers, and a means of allowing the control means to move pivotally relative to the axis of the mandrel.

The invention will be better understood as to its advantages and features from the following detailed description taken in conjunction with the accompanying drawings which illustrate by way of example some preferred embodiments.

DETAILED DESCRIPTION OF THE INVENTION

Figure 1:
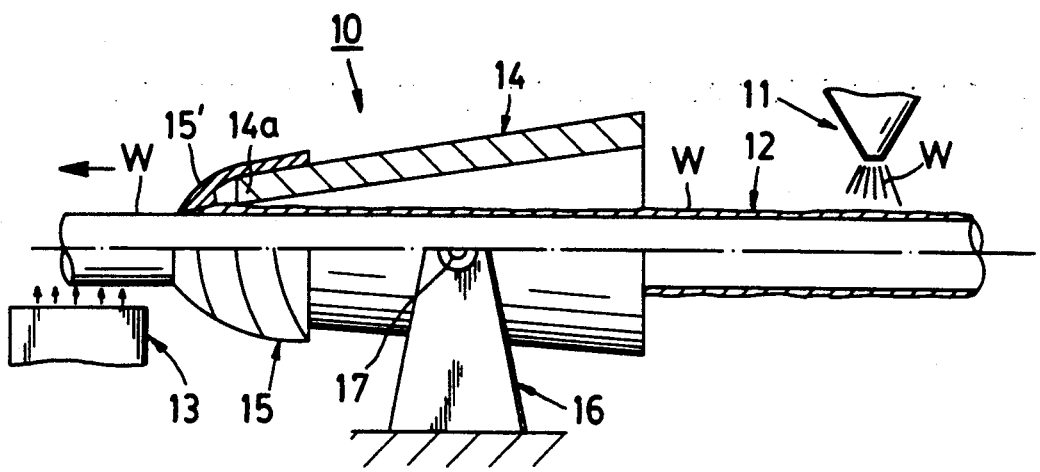
FIG. 1 is a side elevational, partly in section of an apparatus embodying the invention.

Referring now to the drawings and FIG. 1 in particular, there is shown an adhesive applying apparatus 10 which essentially comprises an applicator means 11, such as a sprayer, for applying or spraying an adhesive compound W peripherally over a resin-coated mandrel 12, a heater means 13 located remote from and downstream of the applicator 11 to dry the adhesive compound W which has been applied to and coated on the mandrel 12 and means 14 for controlling the thickness of adhesive coating W by squeezing and smoothing the adhesive compound W coated over the mandrel 12 interposed between the applicator 11 and the heater 13 and having a tapered tip end 14a of round cross section located in proximity to the heater 13.

The mandrel 12 is in the form of an elongated rod made of an elastomeric material such as rubber or a resinous material such as nylon and is coated with a solvent resistant resin which may be chosen according to the type of adhesive compound W used. The mandrel 12 is transported by means not shown unidirectionally along a horizontal path of movement axially as shown by the arrow in FIG. 1.

The control means 14 is in the form of a conical or tapered cylindrical tube made of elastomeric, resinous or metallic material and coated internally with a solvent resistant resin such as Teflon, a fluorinated ethylene polymer, and having one of its ends 14a tapering off downstream of the advancing movement of the mandrel 12 or adjacent to the heater 13. The perimeter of the tapered end 14a of the control means 14 is slightly larger than the perimeter of the mandrel 12.

The control means 14 includes a scraper 15 which is formed from a circular knit web 15' of long length nylon fibers highly resistant to solvents, highly stretchable and mechanically strong. A typical example of such a knit web is a commercially available nylon stocking. Other suitable materials may be chosen by one skilled in the art depending upon the type of adhesive compound W used. The scraper 15 is formed on the control means 14 by wrapping the web 15' around the tapered tip end 14a of the control means 14 to form a curcular cap so that it extends around a leading end portion of the mandrel 12 which has been drawn through and past the opening of the leading end 14a. Pulling the leading end portion of the mandrel 12 out of the tip end 14a of the control means 14 engages it with the circular web 15' which serves as the scraper 15 having a circular opening whereby any excess of the adhesive coating W applied by the applicator 11 to the mandrel 12 is squeezed and scraped off to maintain a uniform coating thickness and provide a smooth coated surface.

The control means 14 is mounted on a support block 16 and is pivotally connected thereto by a pin 17 as shown in FIG. 1 so that the control means 14 can follow a wavy vertical wobble of the mandrel 12 relative to its axis which may occur during its horizontal advancing movement. Preferably, additional means, not shown, may be provided to enable the control means to pivot horizontally with respect to the axial plane of the mandrel 12 so as to follow a horizontal wobble of the mandrel 12.

A method according to the invention of applying a uniform adhesive coating W to the mandrel 12 comprises applying a predetermined amount of adhesive compound W continuously and peripherally to and over the mandrel 12, advancing the mandrel 12 along a horizontal path of movement, drawing a leading end of the mandrel 12 through a circular opening defined by a circular knit web of long length nylon fibers secured to the leading tapered end 14a of the control means 14 whereupon any excess of the adhesive coating W is scraped off to maintain a uniform coating thickness, allowing the control means 14 to move pivotally relative to the axis of the mandrel 12 and heating the mandrel 12 to dry the adhesive coating W.

Figure 2:
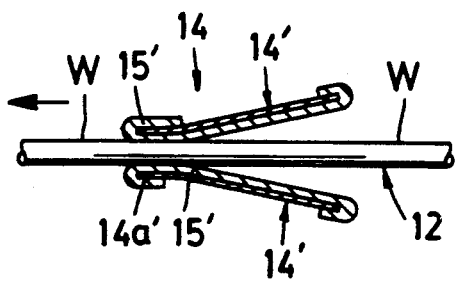
FIG. 2 is a longitudinal cross-sectional view of another form of the apparatus embodying the invention.

An alternative form of the control means 14 shown in FIG. 2 comprises a cylindrical tube 14' lined internally with a circular knit web 15' of long length nylon fibers and having a circular opening defined by and at a tapered leading end 14a' which is likewise internally lined with the same circular knit web and adapted to pass the mandrel 12 therethrough. This construction provides a similar effect to the above described embodiment.

Obviously, various modifications and variations of the present invention are possible in the light of the above teaching. It is therefore to be understood that within the scope of the appended claims the invention may be practiced otherwise than as specifically described.

What is claimed is:

1. Apparatus for applying a uniform adhesive coating to a resin-coated mandrel comprising applicator means for continuously applying a coating of an adhesive compound peripherally to and over an axially moving elongated and round resin-coated mandrel, heater means, located remote from and downstream of said applicator means with respect to the direction of travel of said mandrel, for drying said adhesive compound that has been coated on said mandrel, control means for controlling the thickness of said coating of adhesive compound located between said applicator means and said heater means, said control means comprising a conical tube having an inner surface that tapers to a leading tip end relative to said direction of travel of the mandrel, said tip end having a circular opening therein through which said mandrel passes that is larger in size than said mandrel, scraper means comprising a circular knitted web of stretchable long length nylon fibers mounted on the tip end of said tube, said web having a circular opening therein axially aligned with the opening in the tube and smaller in size than said mandrel for scraping off any excess of said adhesive coating as the mandrel passes through it and means allowing said control means to pivot about on an axis perpendicular to the axis of said mandrel.

2. The apparatus of claim 1, wherein the circular knitted web of nylon fibers forms a circular cap that fits over the outside external side of the tip end of the tube, the axially aligned opening therein being located downstream of the circular opening in said tip end of the tube.

3. The apparatus of claim 1, wherein the circular knitted web of nylon fibers lines the inner surface of the conical tube including its tip end to form a circular opening in the web at the tip end of the tube that is coaxial with the circular opening in the tip end of the tube.

* * * * *